United States Patent [19]
Freeman

[11] Patent Number: 6,079,130
[45] Date of Patent: Jun. 27, 2000

[54] PORTABLE GOLD MINING DREDGE

[76] Inventor: Thomas A. Freeman, 3308 Twin Elms Dr., Eugene, Oreg. 97408

[21] Appl. No.: 09/240,045

[22] Filed: Jan. 29, 1999

[51] Int. Cl.[7] .............................. B63C 11/00; B63C 11/48; E02F 3/88; E03B 11/00; E03C 1/046

[52] U.S. Cl. ............................. 37/314; 37/320; 15/327.1; 137/268; 137/544; 137/565.01; 299/7; 417/900

[58] Field of Search ............................. 37/314, 317, 320, 37/333; 15/301, 327.1; 137/268, 544, 546, 565.01; 417/148, 900; 299/7

[56] References Cited

U.S. PATENT DOCUMENTS

| | | |
|---|---|---|
| 402,178 | 4/1889 | Miller . |
| 417,933 | 12/1889 | Newbery ................................... 37/320 |
| 496,342 | 4/1893 | Collins ...................................... 37/320 |
| 500,445 | 6/1893 | Wade et al. ............................... 37/320 |
| 1,028,717 | 6/1912 | Hallock . |
| 1,672,401 | 6/1928 | Andreasen . |
| 1,844,614 | 2/1932 | Tokheim . |
| 2,083,582 | 6/1937 | Taylor et al. ............................... 137/1 |
| 2,534,808 | 12/1950 | Bevington, Jr. et al. ................ 417/363 |
| 3,776,274 | 12/1973 | Riley ........................................ 137/599 |
| 5,425,188 | 6/1995 | Rinker ....................................... 37/317 |
| 5,487,228 | 1/1996 | Marazzo et al. .......................... 37/317 |
| 5,598,647 | 2/1997 | Marazzo et al. .......................... 37/317 |

*Primary Examiner*—Eileen Dunn Lillis
*Assistant Examiner*—Gary S. Hartmann
*Attorney, Agent, or Firm*—Robert E. Howard

[57] ABSTRACT

A portable gold mining dredge for use in collecting potentially gold containing aggregate from streambeds for subsequent classification and separation. The dredge has a receptacle, comprised of a drum with a water-tight lid, for receiving the aqueous dredged aggregate. The receptacle is of a size suitable for carrying. A self-priming pump having an inlet port and an outlet port is attached to the receptacle. A dip tube extends into the receptacle, the outer end of the dip tube being connected to the inlet port of the pump by a conduit. A suction tube communicates with the interior of the receptacle. Hoses are connected to the inlet of the suction tube and to the outlet port of the pump. During operation the suction hose is used to suck up aqueous aggregate from a streambed and the discharge hose is used to wash aggregate from cracks and crevices in rocks.

6 Claims, 2 Drawing Sheets

PORTABLE GOLD MINING DREDGE

BACKGROUND OF THE INVENTION

This invention relates to a portable mining dredge for collecting gold bearing sand and gravel from waterways or other wet depressions.

Recreational gold mining typically involves "panning" for gold in streambeds by placing sand and gravel that may contain gold into a pan for separation of any gold from the sand and gravel. The sand and gravel thus collected for separation is that which is easily accessible to the person doing the panning. However, sand and gravel located in non-accessible cracks and crevices of rocks inside or outside of the streambed is a fruitful source for gold, especially in streams where easily accessible sand and gravel may have been worked over by others.

In the past commercial dredging of gold bearing sand and gravel has been carried out using large hydraulic cannons and other large dredging devices. Such devices are clearly not usable by the recreational gold miner.

It is an object of the present invention to provide a dredging apparatus which is portable, which simplifies the collection of potentially gold bearing sand and gravel for subsequent separation, and which can be used for retrieving potentially gold bearing sand and gravel from otherwise inaccessible locations in streambeds or from the cracks and crevices of rocks located outside of a streambed.

BRIEF SUMMARY OF THE INVENTION

The invention is a portable gold mining dredge comprised of a closed receptacle for collecting an aqueous aggregate of sand and gravel, and a self-priming pump attached to the receptacle. The pump has an inlet port and an outlet port. The receptacle has a suction tube communicating the interior thereof with the atmosphere to which is attached a suction hose used for sucking water, sand and gravel into the receptacle. A dip tube extends into the receptacle and is connected at its outer end to the inlet port of the pump by a flexible conduit. The outlet port of the pump is attached to a discharge hose which may be used to direct water under pressure into cracks and crevices for washing out potentially gold bearing sand and gravel.

DESCRIPTION OF THE PREFERRED EMBODIMENTS

Figure 1:
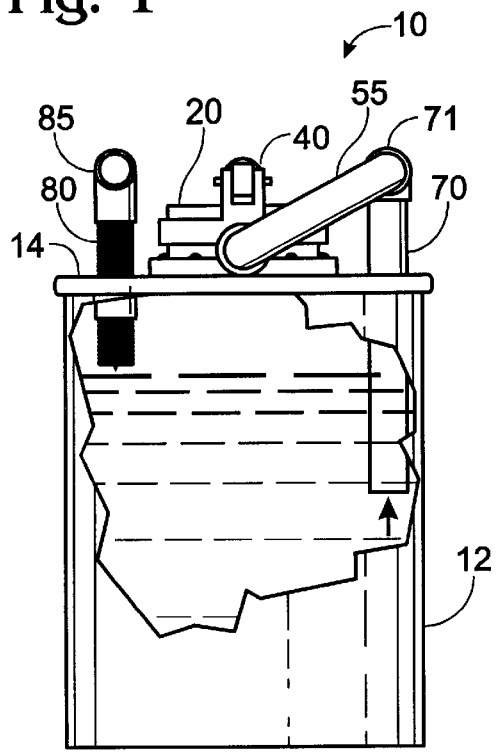
FIG. 1 is a front elevation view of the apparatus of the invention.

The portable dredge apparatus 10 of the invention is comprised of a receptacle having a collection tank or drum 12 and a top or lid 14. Lid 14 is attached to drum 12 by a circular drum clasp 16.

Drum 12 and lid 14 may be made of any water-resistant material such as metal or plastic. The size of drum 12 may be any size which can be easily carried. A ten gallon drum has been found to be suitable for most purposes. However, the size may vary between about 5 and about 30 gallons. Larger sizes, such as a standard 55 gallon drum, could be used if carried by a hand dolly, and/or if a removable basket is used as will be discussed below.

Figure 4:
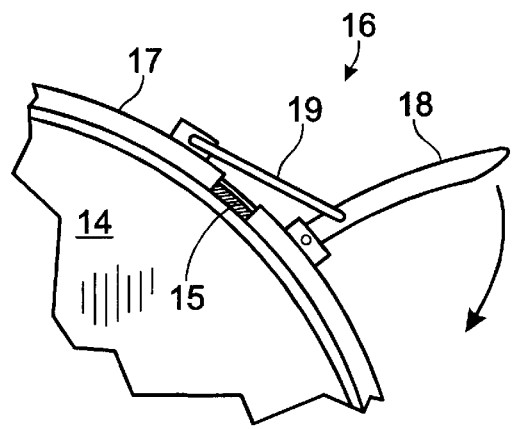
FIG. 4 is a partial bottom view of the lid of the apparatus of the invention.

A partial bottom view of lid 14 and circular drum clasp 16 is shown in FIG. 4. Clasp 16 is comprised of a circular rim 17 cut through perpendicularly to its circumference resulting in two ends, and allowing rim 17 to be expanded. Latch 18 is pivotally connected at one of its ends to a first end of rim 17. Hinge 19 is pivotally connected at one of its ends to the second end of rim 17. Hinge 19 is pivotally connected at its other end to latch 18 at a mid-portion thereof. Movement of latch 18 in the direction of the arrow shown in FIG. 4 results in the first and second ends of rim 17 being brought together. When placed around the top of drum 12 and lid 14, closure of rim 17 of clasp 16 results in lid 14 being tightly held against the top of drum 12.

To further aid in providing a water-tight seal when lid 14 is locked onto the top of drum 12, a circular and tubular gasket 15 is positioned in a trough located around the circumference of lid 14 to provide such a seal.

Figure 5:
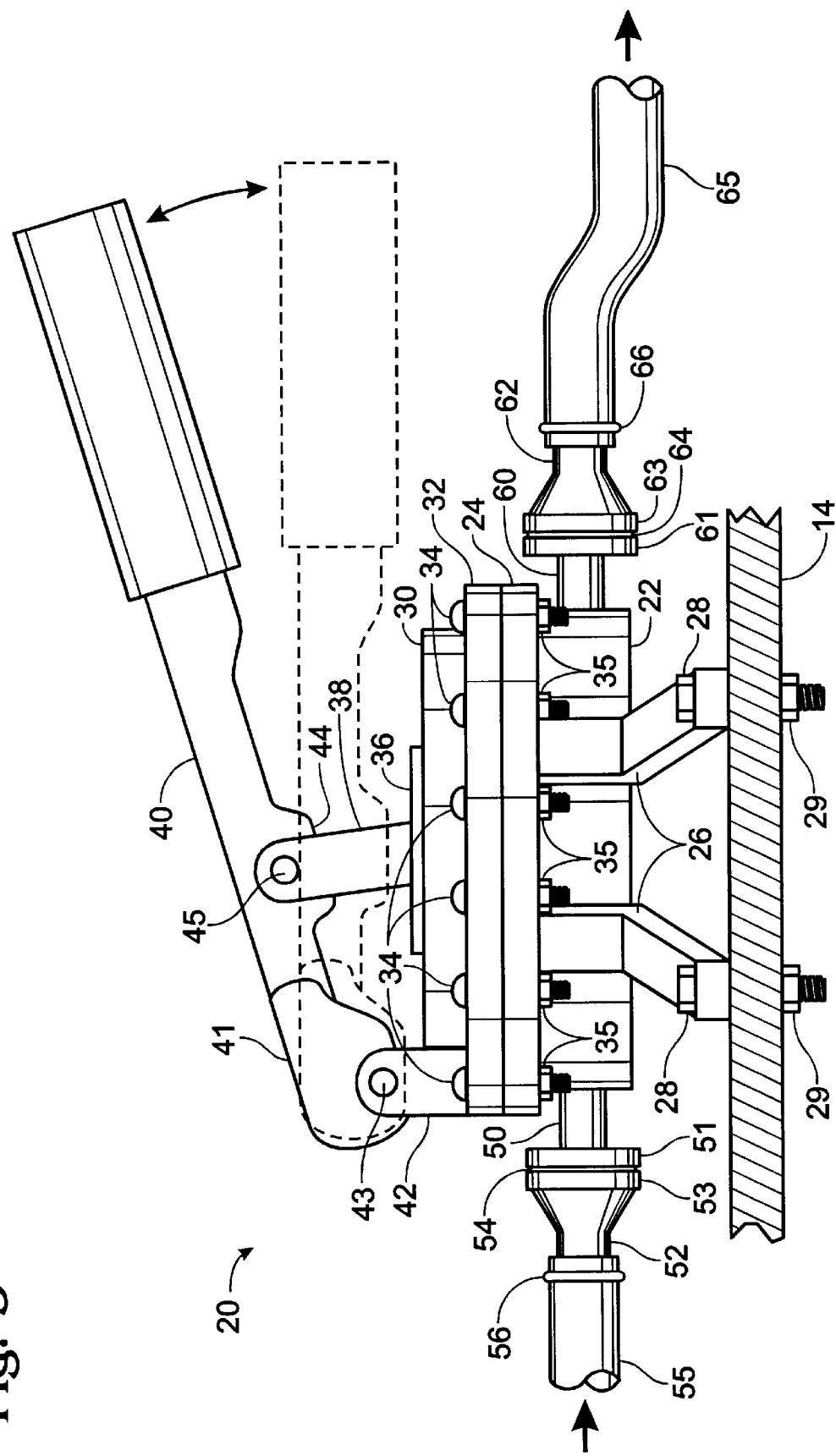
FIG. 5 is a side, elevation view of the self-priming pump used in the apparatus of the invention.

Attached to the top of lid 14 is a self-priming hand pump 20. A preferred embodiment of pump 20 is best seen by reference to FIG. 5. A suitable pump for use in the present invention is one sold under the trademark "Guzzler" by The Bosworth Co. of E. Providence, R.I.

Pump 20 is comprised of a circular plastic or metal pot 22 having an integral circular flange 24 extending outwardly from the top thereof. Pot 22 has four integrally attached leg members 26 extending downwardly therefrom. The base of each leg member 26 is attached to lid 14 by a bolt 28 and a nut 29.

A flexible diaphragm 30 is attached to the top of pot 22 by means of a ring 32. Ring 32 is attached to flange 24 by means of bolts 34 and associated nuts 35. Diaphragm 30 has a rigid cap member 36 attached thereto from which extends a female swivel bracket 38.

A handle 40 is pivotally attached at its lower end 41 to swivel bracket 42 by means of swivel pin 43. Handle 40 has a male swivel bracket 44 located at its mid-portion which is pivotally attached to female swivel bracket 38 by swivel pin 45. Handle 40 may be moved up and down, in the direction indicated by the arrows in FIG. 5, to provide pumping action.

An inlet port 50 communicates with the interior of pot 22. Inlet port 50 has a flange 51 integrally attached to its outer end. An inlet hose fitting 52 having a flange 53 is attached to flange 51 of inlet Dort 50 by suitable fastening members, such as nuts and bolts. A gasket 54 is located between flanges 51 and 53. The diameter of inlet hose fitting 52 is selected to accommodate an appropriate flexible inlet hose 55 which is attached at its outlet end to inlet hose fitting 52 by hose clamp 56, or other suitable attachment means.

An outlet port 60 also communicates with the interior of pot 22. Outlet port 60 has a flange 61 integrally attached to its outer end. An outlet hose fitting 62 having a flange 63 is attached to flange 61 of outlet port 60 by suitable fastening members, such as nuts and bolts. A gasket 64 is located between flanges 61 and 63. The diameter of outlet hose fitting 62 is selected to accommodate an appropriate flexible discharge hose 65 which is attached to outlet hose fitting 62 by hose clamp 66, or other suitable attachment means such as threaded fittings, or quick connect/disconnect fittings.

Inlet and outlet ports 50 and 60 of pump 20 have suitable valves associated therewith (not shown) to permit water to flow from drum 12 into inlet port 50 and out of discharge port 60 during pumping, as well known in the pump art.

Returning now to FIGS. 1–3, it can be seen that the inlet end of inlet hose 55 is attached to the outlet end 71 of dip tube 70 by means of a hose clamp or other suitable attachment means. Dip tube 70 extends through lid 14 and into drum 12 to a mid-portion thereof, as shown, and is attached thereto by water-tight attachment means.

A suction tube 80 extends outward from lid 14 and communicates the interior of drum 12 with the atmosphere. Tube 80 is attached to lid 14 by water-tight attachment means. A flexible suction hose 85 is attached to the outer end of suction tube 80 by any suitable means, such as a hose clamp, threaded fittings or quick-connect/disconnect fittings.

Figure 2:
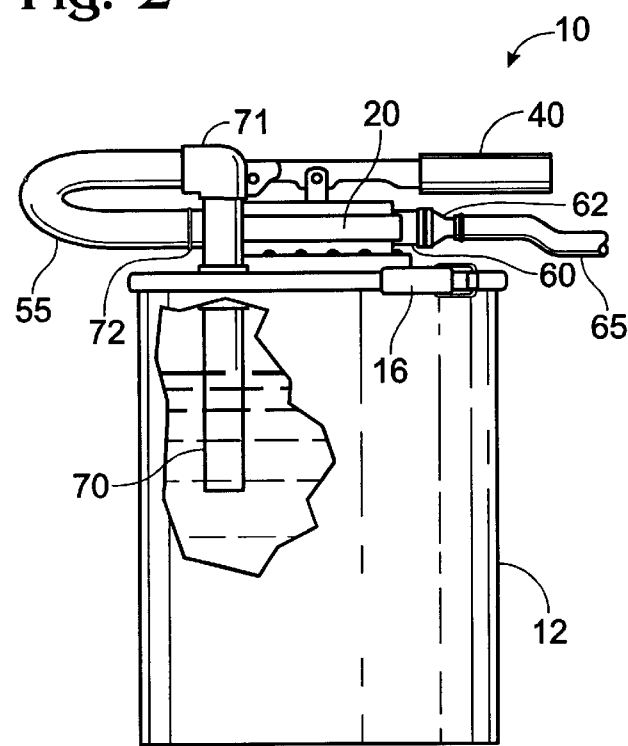
FIG. 2 is a side elevation view of the apparatus of the invention.
Figure 3:
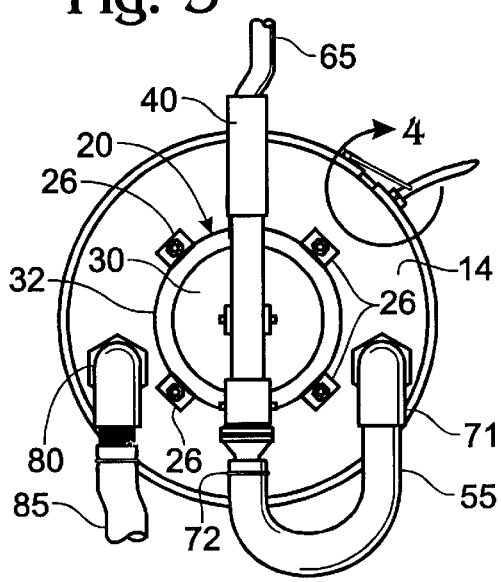
FIG. 3 is a top plan view of the apparatus of the invention.

In operation, lid 14 is placed on empty drum 12 and latched tightly in place by locking clasp 16 into its closed position. Outlet hose 65 and suction hose 85 are tightly attached to outlet hose fitting 62 and the inlet of suction tube 80, respectively. Suction hose 85 is placed in a stream bed adjacent sand and gravel to be dredged. The handle 40 of self-priming pump 20 is manually pumped up and down. This causes air to be evacuated from drum 12 via outlet hose 65. When a sufficient vacuum has been created within drum 14, an aqueous aggregate of water, sand, and gravel are sucked up into suction hose 85 and into drum 14. When the water level in drum 14 rises above the intake of dip tube 70 (as shown in FIGS. 1 and 2), water is pumped up through dip tube 70, through inlet hose 55, into pot 22 of pump 20, and discharged through outlet port 60 and out of discharge hose 65. Any sand and gravel sucked into drum 12 will settle to the bottom by gravity, and not be pumped out through discharge hose 65.

If it is desired to collect sand and gravel located in inaccessible cracks and crevices, the outlet end of discharge hose 65 can be directed into such locations for washing out sand and gravel therefrom, the washed out sand and gravel being sucked up by suction hose 85.

When a desired amount of sand and gravel is collected in drum 14, dredging is stopped and the sand and gravel removed for subsequent classification and separation using a pan, sluice or other means.

Although not illustrated, a porous wire bucket may be suitably positioned inside drum 12 at its bottom or some intermediate location to filter out and collect sand and gravel from the aqueous slurry pumped into drum 12. Such a bucket can then be removed from drum 12 and the sand and gravel collected therein carried to another location for panning or sluicing.

Other variations may be made to the preferred embodiments described above without departing from the scope of the claims herein.

The invention claimed is:

1. A manually portable gold mining dredge comprising:
   a receptacle comprised of a drum for collecting an aqueous aggregate of sand and gravel, said drum having a first upper end, a second lower end, and a middle potion located between said first and second ends, and a lid removably attached to said first upper end of said drum;
   a self-priming hand pump attached to said receptacle, said pump having an inlet port and an outlet port;
   a discharge hose attached to said outlet port of said pump;
   a dip tube extending into said drum, said dip tube having an inner end located within said drum and an outer end located outside of said drum;
   a conduit having first and second ends, said conduit being attached at its first end to the outer end of said dip tube and attached at its second end to the inlet port of said pump;
   a suction tube extending into said receptacle, said suction tube having an inner end located within said drum and an outer end located outside said drum; and
   a suction hose attached to the outer end of said suction tube.

2. The portable dredge of claim 1 wherein said dip tube extends downwardly into said drum to an extent such that the inner end thereof is positioned at the middle portion of said drum.

3. The portable dredge of claim 1 wherein said suction tube extends downwardly into said drum to an extent such that the inner end thereof is positioned inside the first upper end of said drum.

4. The portable dredge of claim 1 wherein said pump is attached to the lid of said receptacle.

5. The portable dredge of claim 1 wherein said drum has a volume of between about 5 and about 55 gallons.

6. The portable dredge of claim 1 wherein said drum has a volume of about 10 gallons.

* * * * *